May 12, 1936.  S. G. SWANSON  2,040,450
AUTOMATIC TRANSMISSION
Filed Aug. 6, 1934   3 Sheets-Sheet 1

Inventor
Swan George Swanson
by Arthur W. Nelson
Atty.

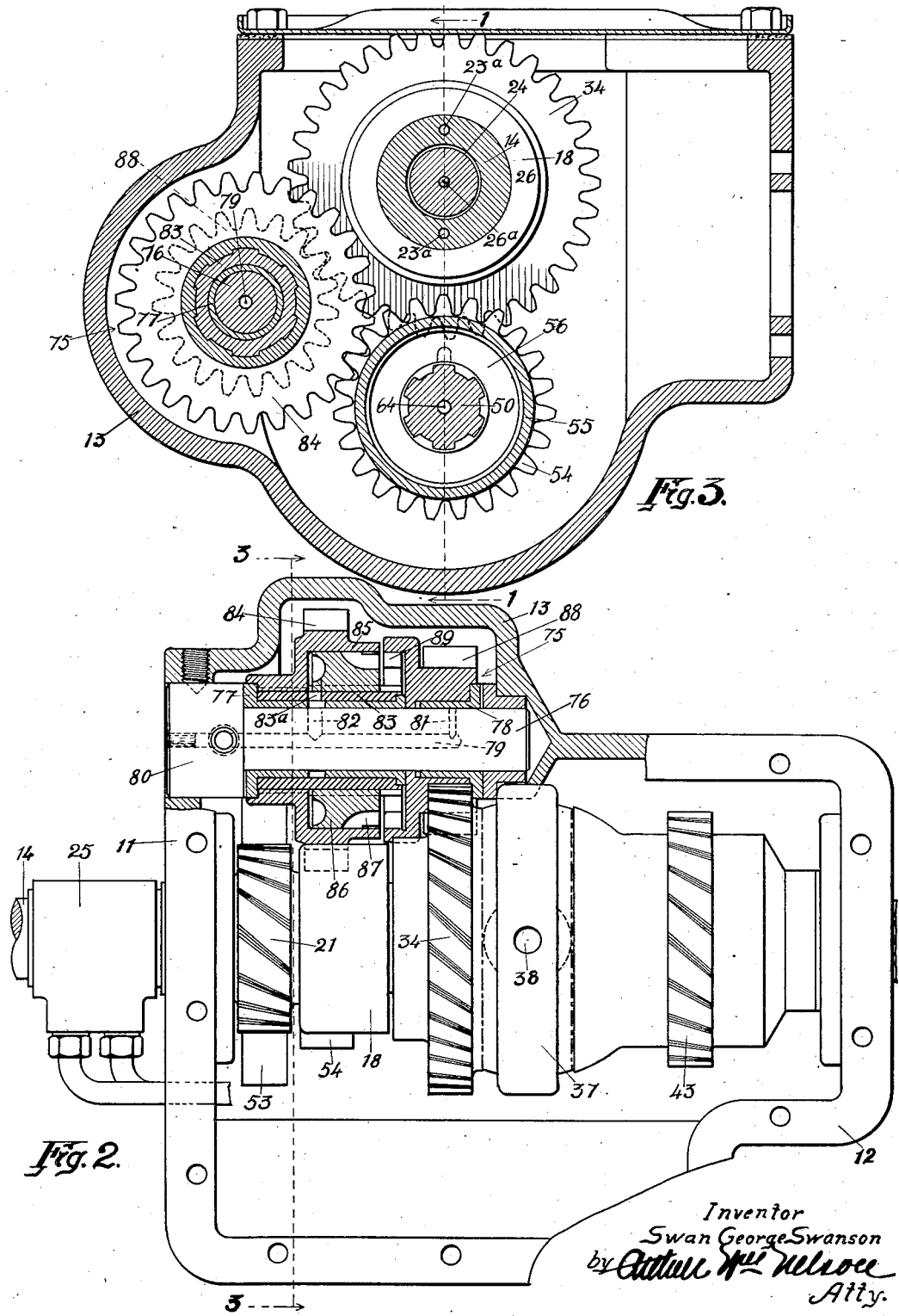

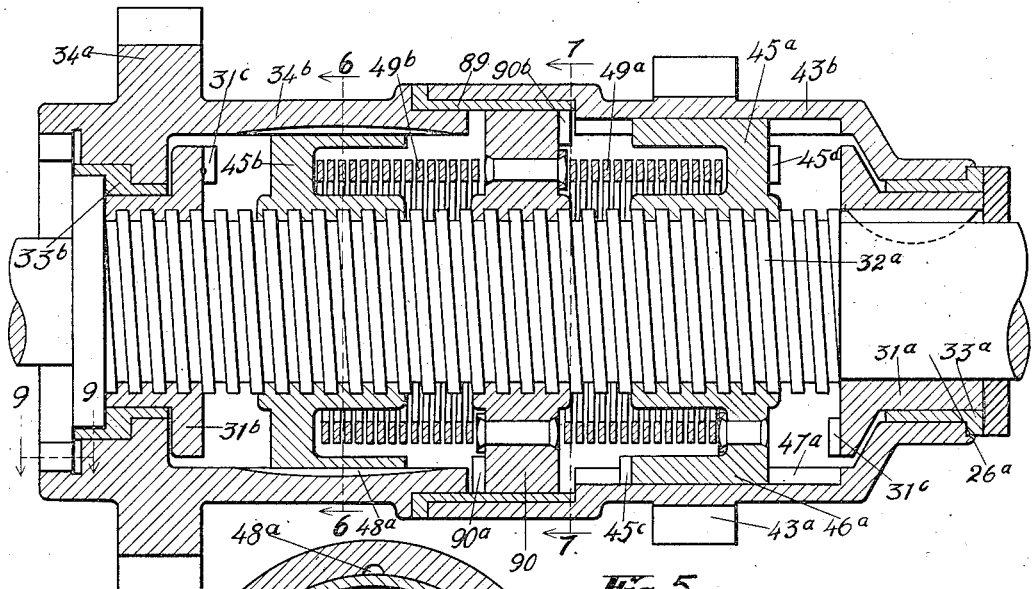
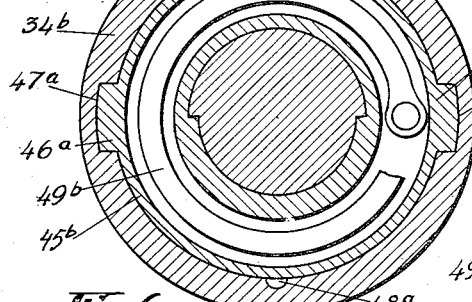
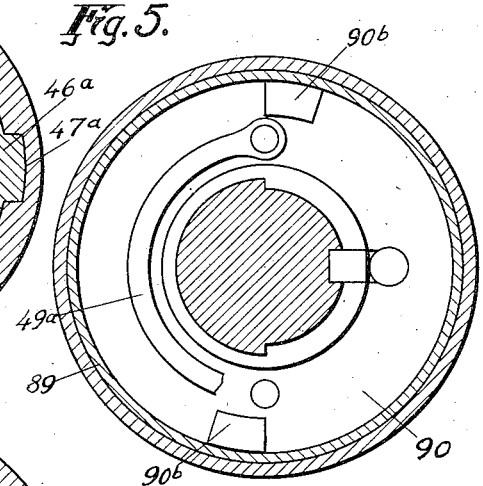
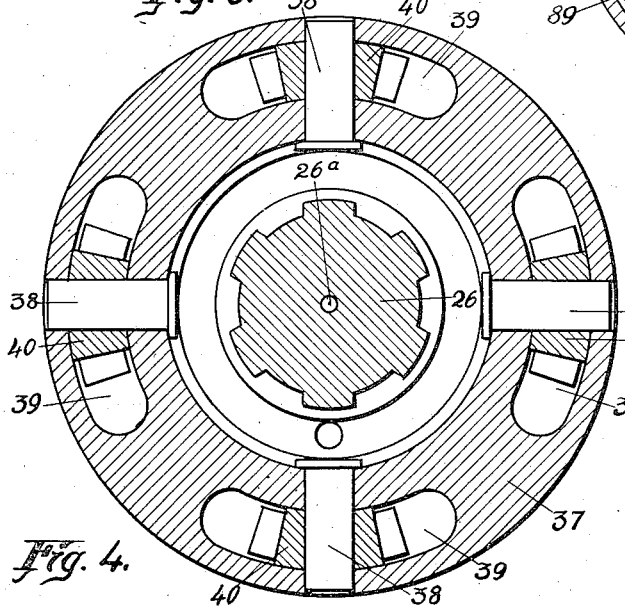
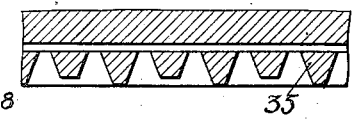

Patented May 12, 1936

2,040,450

UNITED STATES PATENT OFFICE 2,040,450

AUTOMATIC TRANSMISSION

Swan George Swanson, Chicago, Ill.

Application August 6, 1934, Serial No. 738,625

21 Claims. (Cl. 74—364)

This invention relates to improvements in automatic transmissions and it consists of the matters hereinafter described and more particularly pointed out in the appended claims.

The transmission with which the present invention is more particularly concerned is of the type shown in my co-pending application Serial No. 709,709 filed February 5, 1934 and is especially adapted for use in automotive vehicles.

One of the objects of the present invention is to simplify the structure of the transmission and reduce both its cost and size to a minimum and at the same time improve its operation.

Other objects of the invention, as well as the several advantages thereof, will more fully appear as I proceed with my specification.

In the drawings:

Fig. 2 is a top plan view of the transmission with the cover plate removed from the casing and with certain parts appearing in section, better to disclose the reverse gearing of the transmission.

Fig. 3 is a transverse vertical sectional view through the transmission as taken on the line 3—3 and on substantially the scale of Fig. 1.

Fig. 4 is a transverse vertical detail sectional view through a part of the transmission as taken on the line 4—4 of Fig. 1.

Fig. 5 is a fragmentary, longitudinal vertical sectional view through a modified form of cushion-clutch structure associated with the driven shaft and whereby said shaft may be connected to the driving shaft at different relative speeds.

Figures 1, 8:
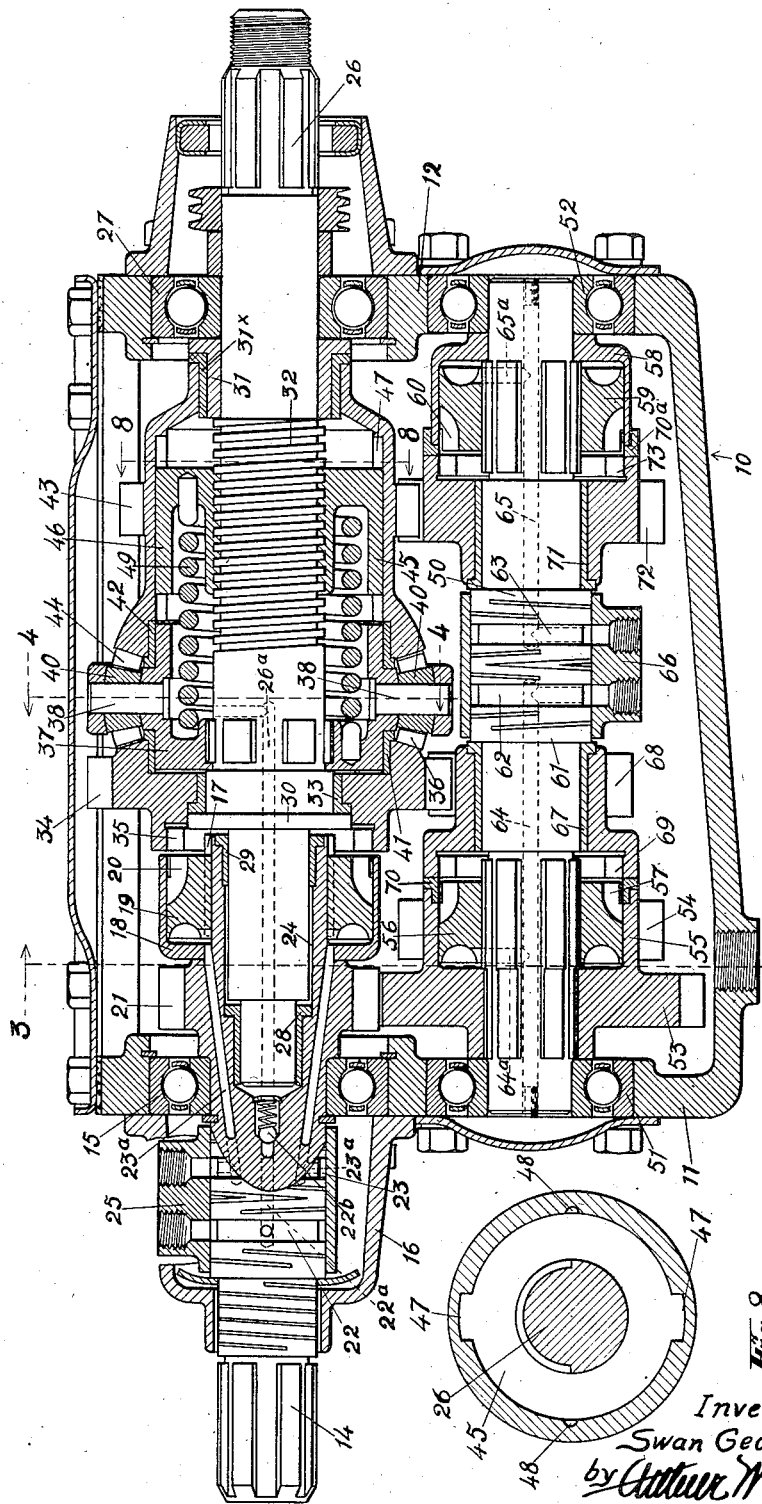
Fig. 1 is a longitudinal vertical sectional view through a transmission embodying the preferred form of the invention, the plane of the section being indicated by the line 1—1 of Fig. 3.

Figs. 6 and 7 are detail vertical sectional views through the structure shown in Fig. 5 and as taken on the lines 6—6 and 7—7 respectively, of Fig. 5.

Fig. 8 is a detail vertical sectional view through a part of the transmission as taken on the line 8—8 of Fig. 1.

Fig. 9 is a detail view showing a development of the teeth of certain clutch elements embodied in the transmission and which will be more fully referred to later.

In general, the transmission as shown herein is of the constant mesh gearing type, the driving and driven shafts being operatively connected together through clutches which are shifted into and out of operative position by means of a hydraulic fluid under pressure. As the means for directing such fluid to the desired clutch forms no part of the present invention, the same is not illustrated herein. However, the means illustrated and described in my above-mentioned application may be used for this purpose.

Referring now in detail to that embodiment of the invention illustrated and described in Figs. 1 to 4 and 8 inclusive of the accompanying drawings:

10 indicates as a whole a conventional type of transmission casing such as used in automotive vehicles. As shown herein, said casing which is open at the top includes front and rear end walls 11 and 12 respectively and one of the side walls includes a lateral extension 13 (see Fig. 2) for the reverse gear mechanism as will soon appear.

14 indicates the driving shaft of the transmission which is suitably journalled at a point between its ends in an antifriction bearing 15 in the front end wall of the casing. Enclosing a portion of the driving shaft, forwardly of the front end wall 11 is a housing 16. The rear end of said shaft is externally splined as at 17 and substantially surrounding the same is a rearwardly opening cup 18. The cup encloses a clutch collar 19 which is longitudinally shiftable on the splined portion 17 of the driving shaft, and has rearwardly facing clutch teeth 20. Between the cup 18 and bearing 15, the shaft is made to provide a gear 21. That part of the shaft 14 within the housing 16 is provided with a pair of annular grooves 22 and 23 respectively, the former communicating by a passage 22a with a recess 24 in the rear end of the shaft and the latter communicating by passages 23a with the interior of the cup at a point to the front of the clutch member 19. A check valve 22b is provided at the rear end of the passage 22a where it opens into the recess 24. Surrounding that part of the shaft within the housing 16 is a collar 25 provided with means whereby conduits for a hydraulic fluid under pressure such as oil, may be delivered into said annular grooves 22—23.

The driven shaft of the transmission is indicated at 26. This shaft is journalled at its rear end in an antifriction bearing 27 mounted in the rear wall 12 of the casing. The front end of this shaft extends into the recess 24 in the rear end of the driving shaft and is journalled in bearing bushings 28 and 29 in said recess. Just to the rear of the bushing 29 said shaft is provided with a radial shoulder 30. Just forwardly of the bearing 27, said shaft extends through a collar 31 and forwardly of said collar said shaft is provided with a helical thread portion 32.

To the rear of the shoulder 30 there is mounted on said shaft a bearing bushing 33 on which is journalled a gear 34. This gear is provided at its front end with internal clutch teeth 35, adapted to receive the clutch teeth 20 of the clutch collar 19. Preferably as best shown in Fig. 9, the clutch teeth of the sets of clutch teeth 30 and 35 are made in different lengths and have angular or sloping sides whereby they will better disengage upon a relative rotative movement between the gear 34 and clutch 19. At the rear end of said gear 34 are provided bevel gear teeth 36.

A differential spider 37 is splined to the driven shaft just to the rear of the gear 34 and carries a plurality of radial studs 38 which extend through openings 39 therein as shown in Fig. 4. Differential pinions 40 are journalled on said studs within said openings. These pinions mesh with the bevel gear teeth 36 of the gear 34. A bearing bushing 41 is interposed between the front end of the spider 37 and gear 34 and on the rear end of said spider is a bearing bushing 42.

A sleeve-like gear 43 is restricted at its rear end to be journalled on the bushing 31x on the collar 31 and the front end of said gear is journalled on the bushing 42 on the rear end of the spider 37. The last mentioned end of said gear is provided with bevel teeth 44 for engagement by the pinions 40.

A nut or traveler 45 is located in the sleeve-like gear 43 and is provided with an internal helical thread for engagement with the threaded portion 32 of the driven shaft. This nut is provided with diametrically opposite, longitudinal splines 46 which engage in longitudinal, internal grooves 47 in the sleeve-like gear, so as to rotate therewith but under certain conditions, be capable of a limited, relative, longitudinal movement. In a plane at a right angle to the grooves 47, the gear-like sleeve 43 is provided with longitudinal, internal by-pass grooves 48, see Fig. 8 whereby a hydraulic cushioning fluid such as an oil, contained within the sleeve-like gear may by-pass around the nut from one end to the other of the gear 43 as the nut moves longitudinally on the driven shaft. The cushioning fluid mentioned, enters the chamber in said gear through a passage 26a in the front end of the shaft. A torsional spring 49 surrounds that portion of the shaft 26 between the spider 37 and nut 45, said spring having a toed connection at its ends with said spider and nut respectively.

50 indicates the jack or countershaft of the transmission which is disposed preferably in the plane of but below that of the driving and driven shafts. This shaft is journalled at its ends in antifriction bearings 51—52 mounted on the end walls 11 and 12 of the casing. Splined on the front end of said shaft are gears 53—54, the former being constantly in mesh with the gear 21 on the driving shaft and the latter being in constant mesh with a part of the reverse gear mechanism as will later appear. The hub 55 of said gear is made as a rearwardly opening cup to enclose a clutch member 56 splined to the front end of the jack shaft so as to be longitudinally shiftable thereon. This member has clutch teeth 57 at its rear end.

On the rear end of the shaft is fixed a forwardly opening cup 58 which encloses a clutch member 59 splined on the shaft. This member has clutch teeth 60 at its front end. The shaft 50 is provided at a point between its ends with an enlargement 61 in which is provided annular grooves 62—63 respectively. In the shaft 50 are longitudinal passages 64—65 respectively, each plugged at its outer end and each opening at its inner end by means of a suitable port into an associated groove 62—63. The passage 64 opens into the cup 55 at a point in advance of its clutch member 56 by a port 64a and the passage 65 opens into the cup 58 at a point to the rear of the clutch member 59 by means of a port 65a. The enlargement 61 is enclosed by a collar 66 whereby conduits for a fluid under pressure such as oil may be attached thereto so that oil may be delivered into said annular grooves 62—63.

Between the gear 54 and the enlargement 61 there is mounted on the shaft 50, a bearing bushing 67 upon which is journalled a gear 68 which is in constant mesh with the gear 34. The front end of said gear is formed to provide internal clutch teeth 69 for engagement by the teeth 57 of the clutch member 56 when the latter is shifted rearwardly. A thrust bearing ring 70 is interposed between the cup 55 and the gear 68.

Between the cup 58 and the enlargement 61, there is mounted on the shaft 50, a bearing bushing 71 upon which is journalled a gear 72 that is in constant mesh with the gear teeth 43. The rear end of said gear is provided with internal clutch teeth 73 for engagement by the teeth 60 of the clutch member 59 when the latter is shifted forwardly. A thrust bearing ring 70a is interposed between gear 72 and the cup 58.

The casing 10, as before mentioned, is provided at one side with the lateral extension 13 to accommodate a mechanism 75 whereby reverse for the transmission is possible. Said mechanism includes a non-rotative shaft 76 suitably engaged at its ends in parts of the lateral extension 13. On said shaft between its ends are front and rear end bearing bushings 77 and 78 respectively and in said shaft is a longitudinal passage 79. The bushing 77 comprises a pair of longitudinally spaced bearing parts. The front end of the shaft 76 is provided with a collar 80 to receive a conduit whereby fluid under pressure may pass into the front end of the passage. This fluid, which as before described, is an oil, is delivered from the rear end of the passage to the bushing 78 by a port 81. A second port 82 which communicates at its inner end with the passage, opens at its outer end through the longitudinally spaced parts of the bushing 77. Journalled on the bushing 77 as a whole, is a sleeve 83 to which is splined a gear 84 with which the gear 54 on the jack shaft is in constant mesh. The gear 84 is provided with a rearwardly opening cup-like hub 85 to enclose a clutch member 86 having clutch teeth 87 at its rear end. The sleeve 83 is provided with a port 83a which registers with the port 82 whereby fluid under pressure may be admitted to the cup-like hub 85 of the gear 84 at a point in advance of the clutch member so that the clutch member may be shifted rearwardly.

Journalled on the bushing 78 is a pinion 88 in constant mesh with the gear 34. This pinion is provided at its front end with internal clutch teeth 89 for engagement by the teeth 87 of the clutch member 86 when the latter is shifted rearwardly.

It is pointed out that all of the clutch teeth mentioned are formed in the manner of the clutch teeth 35 before described. Thus, after the pressure of the fluid which has caused the shifting of a clutch member, has been released, and a relative rotation is present between the members carrying the engaged clutch teeth, said clutch teeth are automatically disengaged and the clutch member is returned to its normal inoperative position.

The operation of transmission structure above described is as follows:

When the means for controlling the passage of fluid is operative to deliver fluid under pressure to the groove 62 of the jack shaft, said fluid enters the passage 64 and passes out through the port 64a into the cup 55 of the gear 54, at a point in front of the clutch member 56. The pressure of such fluid, causes the clutch member 56 to shift rearwardly to engage its teeth 57 with the teeth 69 of the gear 68. This connects the jack shaft 50 to the driving shaft so that the drive is then from the shaft 14 through the gear 21 to the gear 53. The drive then proceeds through the clutch member 56 to the gear 68 to the gear 34. In the initial part of the movement of said gear, it rotates the differential pinions and this rotates the gear 43 with respect to the driven shaft. In relative rotation between the gear and shaft, the nut or traveler 45 which is rotative with the gear 43 will advance forwardly to wind up the spring. A part of the fluid in the gear 43 in advance of the nut or traveler escapes from in front of the nut through the by-pass grooves 48 to pass to the rear of the nut. As the nut approaches the end of the by-pass grooves, the fluid and the spring will stop the rotation of the nut on the shaft with a cushioning action so that the nut becomes to all purposes, fixed to the shaft. When this occurs the pinions 40 operate to lock the gear 43 to the gear 34 and the drive is then from the gear 34 through pinions 40 to gear 43, nut 45 to the driven shaft 26 and out.

When fluid under pressure is delivered to the groove 63 in shaft 50, it will pass out through the port 65a into the cup 58 to the rear of the clutch member 59. It is pointed out at this time, when the fluid enters the groove 63, it is cut off from the groove 62 so that the pressure of the fluid on the clutch member 56 is released. Due to the shape of the clutch teeth 57—69, the clutch member 56 becomes automatically disengaged from the gear 68. At this time the nut 45 is located toward the front end of the gear 43 and as the speed ratio changes from first to second, the gear 43 and the spring 49 together normally tend to move the nut rearwardly. As the nut moves rearwardly and passes its normal position, the fluid by-passes from the rear of the nut to the front thereof through the grooves 48. The nut then proceeds to move rearwardly against the cushion as provided by the torsion or tension of the spring plus the resistance of the fluid to the rear of the nut. Thus the gear 43 becomes fixed with respect to the shaft 26. Then the drive is from the shaft 14 through the gears 21—53 to the shaft 50 and from said shaft through the clutch member 59 to the gear 72. From this last mentioned gear the drive proceeds to the gear 43 which is now locked to the shaft 26 which is thereby driven.

To provide third speed forward and which is often referred to as "direct drive", fluid under pressure is delivered into the groove 23 in the shaft 14 to pass into the passages 23a and from there enters the cup 18 in front of the clutch member 19. This shifts the same rearwardly to engage its teeth 20 with the teeth 35 of the gear 34. When the clutch member 19 is thus engaged, the clutch member 59 is disengaged by reason of the shape of the teeth 60 and 73, the fluid pressure being removed from the clutch at this time.

At the time the clutch member 19 becomes engaged with the gear 34, the nut 45 is at the rear end of the gear 43. As the speed ratio changes from second to third, due to the gear 43 being connected to the gear 34 through the pinions 40, the nut is rotated and advanced forwardly on the shaft and as said nut approaches the spider 37, the cushion again builds up and the shaft 26 is then locked to the gear 43. Thus the drive is from the shaft 14, gear 34 through the pinions 40 to the gear 43. As the gear 43 is now locked to the shaft 26 through the nut, the drive continues to and out through the shaft 26.

To provide reverse drive, fluid under pressure is directed to the passage 79, (see Fig. 2) out through the port 82 and through the port 83a of the sleeve 83 into the cup of the hub 85 of the gear 84, at a point in advance of the clutch member 86. This shifts the clutch member rearwardly to engage its teeth with the teeth 89 of the gear 88. Thus the drive is through the shaft 14, gears 21, 53, 54 to the gear 84 that is splined on the sleeve 83 to which the clutch member 86 is likewise splined. The drive thus proceeds from the gear 84, to the sleeve 83, to the clutch member 86 and to the gear 88. As this gear is in mesh with the gear 34, the latter is driven in a direction opposite that of the driving shaft.

As the clutch teeth 87 and 89 become engaged, all clutch teeth associated with all other clutches, are in neutral or disengaged. At this time the nut 45 is also in a neutral position. As the gear 34 is being driven in a direction opposite that of the driving shaft, the gear 43 through the pinions 40, is initially driven in a direction opposite that of the gear 34. This will cause the nut to turn on the shaft portion 32 and to move rearwardly thereon. This produces the same cushioning action as before mentioned and locks the gear 43 to the shaft and the said gear also becomes locked to the gear 34 through the pinions 40. The shaft 26, therefore, is now driven by and in the direction of the gear 34, which as before mentioned, is in a direction opposite that of the driving shaft.

It is pointed out that in changing from one speed to another, the clutch member providing the higher speed, is first engaged before the clutch member, providing the lower gear is disengaged. Thus, there is no hiatus of driving power transmission in changing from one speed to another and there is, therefore, no jerky action between speeds.

In the transmission above described, the mechanism, including the nut 45 and spring 49, together with the hydraulic fluid, provides a construction that operates both forwardly and rearwardly to provide a cushion for the three speeds forward and one in reverse.

In Figs. 5, 6 and 7 of the drawings, I have illustrated a modified form of cushioning mechanism wherein the differential arrangement shown in Fig. 1 is eliminated and I provide a pair of cushioning mechanisms each operating in two of the four speeds of which the transmission is capable.

In Fig. 5, 26a indicates the driven shaft, having the threaded portion 32a. Gears 34a—43a are journalled with respect to the shaft and each gear in this instance includes sleeve-like portions 34b and 43b respectively. Between said portions is engaged a thrust ring 89. In the plane of this ring there is fixed on the shaft 26a, an anchor ring 90 having diametrically opposite abutment 90a and 90b on the ends thereof. Mounted for a relative turning and endwise movement on the threaded portion of the shaft within the hub portion 43b is a nut 45a and similarly mounted on said shaft portion within the hub portion 34b is a nut 45b. Each sleeve-like portion is provided with a pair of oppositely disposed, longitudinal grooves 47a in which splines 46a on the associated nut, are engaged. Each sleeve is also provided in a plane at a right angle to that of the splines with by-pass grooves 48a.

In Fig. 5, the nuts are shown so relatively turned as to disclose the splines and grooves in one instance and the by-pass grooves in the other instance.

Associated with each nut is a torsion spring 49a—49b respectively, both springs being secured at their inner ends to the collar 90 and each spring being secured at its outer end to its respective nut. Each nut is provided at its inner end with a stop shoulder 45c for engagement with the associated collar shoulders 90a—90b respectively and each nut is provided at its outer end with a similar stop shoulder 45d. It is pointed out that in Fig. 5, the stop shoulders 45c—45d for the nut 45b do not appear because of the turned position of the nut 45b with respect to the nut 45a.

Collars 31a—31b are secured to the shaft 26a within the respective gears 43a and 34a respectively and each of these collars is provided on the inner face thereof with stop shoulders 31c for engagement by the shoulders 45d on the outer end of the nuts 45a and 45b respectively. Each collar 31a—31b carries a bearing bushing 33a—33b upon which the associated gears 43a and 34a respectively are journalled.

Assume that fluid under pressure is present within the sleeve-like portion of the gears 43a and 34a respectively. Now, assume that the gear 34a is being driven from the drive shaft in the go-ahead direction. Due to the splined connection of the nut 45b with said gear, the nut is caused to travel rearwardly on the threaded portion of the shaft 26a. In this movement of the nut, fluid will by-pass through the grooves 48a from the rear of said nut to the front of the nut. This movement of the nut will tend to wind up the spring and increase its torsional effect in one direction. As the nut approaches the collar, the combined action of the by-passing fluid and the spring will slow down the nut so that when the nut reaches that position wherein its shoulders 45a engage the shoulders 90a of the collar 90, the nut is thereby locked to said collar and consequently to the shaft 26a. By the use of the stop shoulders, the nuts cannot be brought into such face to face engagement with the associated end of the collar as to seize thereagainst to the detriment of the free action desired when the nut is moved forwardly on the shaft again.

When the gear mechanism providing a reverse drive is operated to provide said drive, the nut 45b moves forwardly and is gradually cushioned until its stop shoulders 45a engage the like shoulder 31c on the collar 31b. This locks the gear 34a to the shaft 26a.

The cushioning mechanism within the sleeve portion of the gear 43a operates in the provision of the other two speeds of which the transmission is capable. The nut 45a in one instance travels endwise on the shaft 26a in one direction and in the other instance travels endwise on said shaft in the other direction. Thus it is apparent that there are provided cushioning mechanisms which operate independently of the other in two speeds of the transmission as distinguished from a single cushioning mechanism that operates to perform its intended function for all speeds of which the transmission is capable.

The transmission is simple in construction and is efficient in operation for its intended purpose.

While in describing the invention I have referred in detail to the form, arrangement and construction of the various parts thereof, the same is to be considered only in the illustrative sense so that I do not wish to be limited thereto except as may be specifically set out in the appended claims.

I claim as my invention:—

1. In a transmission, the combination of a drive shaft, a driven shaft, means for operatively connecting said shafts together for rotation in any one of a number of relative speeds, hydraulic means associated with one of said shafts and including a part longitudinally movable thereon, and means actuated from the other of said shafts during its rotation for moving said part longitudinally in the proper direction to cushion said connection at any one of said number of relative speeds.

2. In a transmission, the combination of a drive shaft, a driven shaft, means for operatively connecting said shafts together for rotation in any one of a number of relative speeds, combined hydraulic and torsion spring means associated with one of said shafts and including a part longitudinally movable thereon, and means actuated from the other of said shafts during its rotation for moving said part longitudinally in the proper direction to cushion said connection at any one of said number of relative speeds.

3. In a transmission, the combination of a drive shaft, a driven shaft, means for operatively connecting said shafts together for rotation in any one of a number of relative speeds in forward and in reverse, means including a part longitudinally movable on one of said shafts and operating in conjunction with an enclosed hydraulic fluid and means actuated from the other of said shafts during its rotation for moving said part longitudinally of its shaft in the proper direction for cushioning said connection at any one of said number of relative speeds in forward or in reverse.

4. In a transmission, the combination of a drive shaft, a driven shaft, means for operatively connecting said shafts together for rotation in any one of a number of relative speeds, hydraulic means mounted on the driven shaft and including a part longitudinally movable thereon, and means actuated from the drive shaft during its rotation for moving said part longitudinally of said driven shaft in the proper direction to cushion said connection at any one of said number of relative speeds.

5. In a transmission, the combination of a drive shaft, a driven shaft, means for operatively connecting said shafts together for rotation in any one of a number of relative speeds, combined hydraulic and torsion spring means mounted on the driven shaft and including a part longitudinally movable thereon, and means actuated from the drive shaft during its rotation for moving said part longitudinally of said driven shaft in the proper direction to cushion said connection at any one of said number of relative speeds.

6. In a transmission, a drive shaft, a driven shaft having a threaded portion, longitudinally spaced gears associated with said portion of the driven shaft, a nut on said portion of the driven shaft and having a splined connection with one of said gears, whereby when the latter is rotated said nut will travel endwise on said portion of the driven shaft, means associated with said nut and operating as said nut travels longitudinally on said portion of the driven shaft to connect said one of said gears to the driven shaft with a cushioning action, and means including a clutch for driving said gear from the drive shaft.

7. In a transmission, a drive shaft, a driven shaft having a threaded portion, longitudinally spaced gears associated with said portion of the driven shaft, a nut on said portion of the driven shaft and having a splined connection with one of said gears, whereby when the latter is rotated said nut will travel endwise on said portion of the driven shaft, means associated with said nut and operating as said nut travels longitudinally on said portion of the driven shaft to connect said one of said gears to the driven shaft with a cushioning action, and means including a clutch for driving either gear from the driven shaft.

8. A cushioning connection for use in a change speed transmission comprising in combination, a shaft having a threaded portion, a pair of longitudinally spaced gears associated therewith, a member fixed with respect to said threaded portion, a nut engaged on said threaded portion and having a splined connection with one of said gears whereby rotation of said one of said gears causes said nut to travel longitudinally on the said threaded portion, and hydraulic means associated with said nut to coact therewith as the same moves longitudinally toward or away from said member to provide a cushion in connecting said nut positively to said one of said gears.

9. A cushioning connection for use in a change speed transmission comprising in combination, a shaft having a threaded portion, a pair of longitudinally spaced gears associated therewith, a member fixed with respect to said threaded portion, a nut engaged on said threaded portion and having a splined connection with one of said gears whereby rotation of said one of said gears causes said nut to travel longitudinally on the said threaded portion, and hydraulic means including a torsion spring engaged with said nut and member respectively to coact therewith as the same moves longitudinally to provide a cushion in connecting said nut positively to said one of said gears.

10. A cushioning connection for use in a change speed transmission comprising in combination a shaft having a threaded portion, a pair of longitudinally spaced gears journalled on said shaft, a member fixed to said shaft, pinions journalled on said member and engaged with both gears, a nut arranged on said portion of the shaft and having a splined connection with one of said gears so as to move endwise on said shaft portion in the rotation of one of said gears, and means operating in conjunction with said nut as it so moves on the threaded portion of the shaft as to connect said one of said gears to said shaft with a cushioning action.

11. In a transmission, a drive shaft, a driven shaft, means for operatively connecting said shafts together for rotation in any one of a number of relative speeds in forward or reverse, a cushioning mechanism including a part longitudinally movable on one of said shafts, and means actuated from the other of said shafts during its rotation for moving said part longitudinally of said one of said shafts to cushion the connection between said shafts in any one of said relative speeds in forward or reverse.

12. In a transmission, a drive shaft, a driven shaft, means for operatively connecting said shafts together for rotation in any one of a number of relative speeds in forward or reverse, and a cushioning mechanism surrounding a part of the driven shaft and including a member movable longitudinally of the driven shaft and actuated from the drive shaft during its rotation to cushion the connection between said shafts in any one of said relative speeds in forward or reverse.

13. In a transmission, a drive shaft, a driven shaft, means for operatively connecting said shafts together for rotation in any one of a number of relative speeds in forward or reverse, and a hydraulic cushioning mechanism including a part longitudinally movable on one of said shafts and actuated from the other of said shafts during its rotation to cushion the connection between said shafts in any one of said relative speeds in forward or reverse.

14. In a transmission, a drive shaft, a driven shaft, means for operatively connecting said shafts together for rotation in any one of a number of relative speeds, a cushioning mechanism including a part longitudinally movable on one of said shafts, and a differential device actuated from the other of said shafts for causing longitudinal movement of said part of said cushioning mechanism on its shaft to cushion the connection between said shafts in any one of said relative speeds.

15. In a transmission, a drive shaft, a driven shaft, means for operatively connecting said shafts together for rotation in any one of a number of relative speeds, a hydraulic mechanism including a part longitudinally movable on one of said shafts, and a differential device actuated from the other of said shafts for causing longitudinal movement of said part of said hydraulic mechanism on its shaft to cushion the connection between said shafts in any one of said relative speeds.

16. In a transmission, a drive shaft, a driven shaft, means for operatively connecting said shafts together for rotation in any one of a number of relative speeds, a cushioning mechanism including a part longitudinally movable on one of said shafts, and differential gearing actuated from the other of said shafts for causing longitudinal movement of said part of said mechanism on its shaft to cushion the connection between said shafts in any one of said relative speeds.

17. In a transmission, a drive shaft, a driven shaft, means for operatively connecting said shafts together for rotation in any one of a number of relative speeds in forward or reverse, a cushioning mechanism including a part longitudinally movable on one of said shafts, and a differential device actuated from the other of said shafts for causing longitudinal movement of said part of said cushion mechanism on its shaft to cushion the connection between said shafts in any one of said relative speeds in forward or reverse.

18. In a transmission, a drive shaft, a driven shaft, a differential mechanism including longitudinally spaced gears loose on the driven shaft, a member fixed to the driven shaft between said gears, pinions mounted on said member and engaged with both gears, a cushioning mechanism including a nut endwise movable on one of said shafts and having a splined connection with one of said gears, and means for connecting the other of said gears to the drive shaft.

19. In a transmission, a drive shaft, a driven shaft, a differential mechanism including longitudinally spaced gears loose on the driven shaft, a member fixed to the driven shaft between said gears, a cushioning mechanism including a nut endwise movable on one of said shafts and having a splined connection with one of said gears, and means for driving the other of said gears from the drive shaft at the desired speed ratio.

20. In a transmission, a drive shaft, a driven shaft, a differential mechanism including longitudinally spaced gears on the driven shaft, a member fixed to the driven shaft between said gears, a pinion mounted on said member and meshing with both gears, one of said gears and said member being formed to provide a hydraulic fluid chamber, a nut having a splined connection with said one of said gears and capable of travelling on said driven shaft within said chamber and cooperating with said fluid in forming a cushion connection between said shafts, and means for driving either of said gears from the drive shaft.

21. In a transmission, a drive shaft, a driven shaft, a differential mechanism including longitudinally spaced gears on the driven shaft, a member fixed to the driven shaft between said gears, a pinion mounted on said member and meshing with both gears, one of said gears and said member being formed to provide a hydraulic fluid chamber, a nut having a splined connection with one of said gears and capable of travelling on said driven shaft within said chamber and cooperating with said fluid in forming a cushion connection between said shafts, and means for driving one of said gears in one direction or the other of said gears in either direction from the drive shaft.

SWAN GEORGE SWANSON.